United States Patent
Okada

(10) Patent No.: US 9,167,441 B2
(45) Date of Patent: Oct. 20, 2015

(54) NETWORK ANALYSIS METHOD, INFORMATION PROCESSING DEVICE, AND STORAGE MEDIUM

(71) Applicant: FUJITSU LIMITED, Kawasaki-shi, Kanagawa (JP)

(72) Inventor: Sumiyo Okada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 225 days.

(21) Appl. No.: 13/895,580

(22) Filed: May 16, 2013

(65) Prior Publication Data

US 2013/0329585 A1 Dec. 12, 2013

(30) Foreign Application Priority Data

Jun. 6, 2012 (JP) .................................. 2012-128815

(51) Int. Cl.
*H04W 24/00* (2009.01)
*H04W 24/08* (2009.01)
*H04L 12/26* (2006.01)

(52) U.S. Cl.
CPC ........... *H04W 24/00* (2013.01); *H04L 43/0852* (2013.01); *H04W 24/08* (2013.01)

(58) Field of Classification Search
CPC .. H04W 24/00; H04W 24/08; H04W 43/0852
USPC .......................................................... 370/252
See application file for complete search history.

(56) References Cited

U.S. PATENT DOCUMENTS

2007/0124412 A1   5/2007   Narayanaswami et al.
2010/0128645 A1*  5/2010   Lin et al. ........................ 370/311

FOREIGN PATENT DOCUMENTS

JP   2007-151121   6/2007

* cited by examiner

*Primary Examiner* — Melvin Marcelo
(74) *Attorney, Agent, or Firm* — Oblon, McClelland, Maier & Neustadt, L.L.P.

(57) ABSTRACT

A network analysis method using an information processing device includes receiving packets from a wired network; extracting, from a set of the received packets, a delay packet that was received after at least a predetermined period of time had elapsed since an immediately preceding packet was received; and determining that a packet delay because of a control signal wirelessly sent from an access point coupled to the wired network has occurred, based on periodicity of a timing at which the delay packet was received.

12 Claims, 15 Drawing Sheets

NETWORK ANALYSIS METHOD, INFORMATION PROCESSING DEVICE, AND STORAGE MEDIUM

CROSS-REFERENCE TO RELATED APPLICATION

This application is based upon and claims the benefit of priority of the prior Japanese Patent Application No. 2012-128815, filed on Jun. 6, 2012, the entire contents of which are incorporated herein by reference.

FIELD

The embodiments discussed herein are related to a network analysis method, an information processing device, and a storage medium.

BACKGROUND

Currently, wireless communication systems such as wireless local area networks (LANs) are widely used. In many wireless communication systems, access points (sometimes referred to as "base stations" or "radio repeaters") that perform wireless communication are coupled to wired networks that perform packet communication. Wireless communication devices such as mobile communication terminals wirelessly communicate with access points, so that the wireless communication devices are able to send packets through the access points to wired networks.

An access point sends (for example broadcasts) a control signal in such a way as to allow a wireless communication device to establish a connection to the access point or maintain the connection. Some control signals are periodically sent. For example, in a wireless LAN, an access point sends control signals called beacons at predetermined beacon intervals (for example, at 102.4 millisecond intervals). In this case, a wireless communication device periodically receives some or all of the control signals sent by the access point. If wireless communication between an access point and a wireless communication device is half-duplex communication, the wireless communication device will stop sending packets while receiving a control signal from the access point. Parameters for a control signal, such as the amount of data, transmission rate, and transmission period of a control signal, are sometimes able to be set for each access point.

A wireless LAN system in which a proxy server sends a probe packet to a wireless LAN device, measures a response time until a response to the probe packet returns, and estimates the beacon interval of a wireless LAN base station has been disclosed.

Japanese Laid-open Patent Publication No. 2007-151121 discloses an example of the related art.

SUMMARY

According to an aspect of the invention, a network analysis method using an information processing device includes receiving packets from a wired network; extracting, from a set of the received packets, a delay packet that was received after at least a predetermined period of time had elapsed since an immediately preceding packet was received; and determining that a packet delay because of a control signal wirelessly sent from an access point coupled to the wired network has occurred, based on periodicity of a timing at which the delay packet was received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In some cases, a wireless communication device will stop sending packets to a wired network while receiving a control signal from an access point. Here, a control signal is often sent at a low transmission rate (for example, 1 Mbps) so that many wireless communication devices are able to stably receive the control signal. Therefore, a period of time during which a wireless communication device stops sending a packet because of reception of a control signal is not short enough to be negligible. The control signal may contribute to a delay in the sending of a packet. Furthermore, a delay arising from such a control signal sometimes lengthens because parameters for an access point have been inappropriately set.

With regard to a wireless communication system, when an expected throughput is not achieved, various candidates, including the aforementioned control signal, for the cause of a delay are conceivable. Accordingly, a system administrator does the work for analyzing the cause of a delay of packet transmission. Unfortunately, it has not been easy to analyze whether the cause of a delay of packet transmission lies in control signals sent from an access point to a wireless communication device and how much the delay of packet transmission affects the delay of the entire system.

That is, control signals are sent in a radio zone between an access point and a wireless communication device, rather than being sent over a wired network. For this reason, a method of capturing and analyzing radio signals is conceivable as one method of analyzing the control signal. In order to capture and analyze radio signals, however, a monitoring device has to be placed in the radio zone. Additionally, it is not easy to place a monitoring device at a location where the radio signals of a wireless communication device are able to be captured. In some forms of such a wireless communication system, it is difficult for a system administrator to capture radio signals. In the method of capturing and analyzing radio signals, the radio signals will be analyzed for each combination of one access point and one wireless communication device. Therefore, cause analysis is not efficiently conducted.

Hereinafter, embodiments of the present disclosure will be described with reference to the accompanying drawings.

First Embodiment

Figure 1:
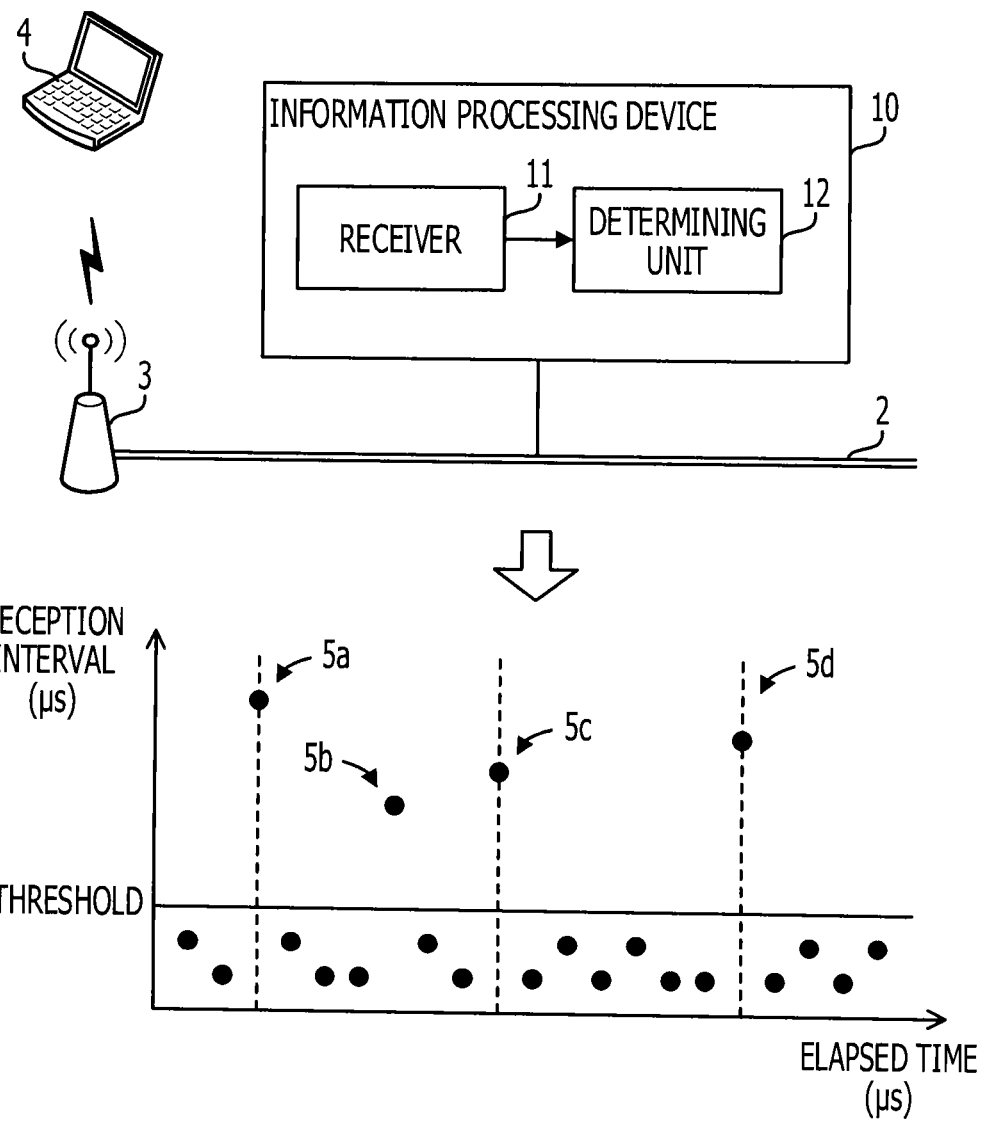
FIG. 1 illustrates an example of a wireless communication system of a first embodiment.

FIG. 1 illustrates an example of a wireless communication system of a first embodiment. A wireless communication system includes a wired network 2, an access point 3, a wireless communication device 4, and an information processing device 10. The access point 3 and the information processing device 10 are coupled to the wired network 2.

The wired network 2 is a network for transmitting packets, and may include relay devices, such as a router and a Layer 2 switch. A transmission control protocol (TCP) and an Internet protocol (IP), for example, are used as protocols of packet communication.

The access point 3 is a communication device that wirelessly communicates with the wireless communication device 4 and also performs wired communication using the wired network 2. As a wireless communication scheme, a wireless LAN scheme specified in Institute of Electrical and Electronics (IEEE) 802.11 is used, for example. Upon receipt of a packet from the wireless communication device 4, the access point 3 forwards the packet to the wired network 2. The access point 3 wirelessly sends information for control of wireless communication, as a control signal. For example, in the wireless LAN case, the access point 3 broadcasts beacons in certain cycles (at beacon intervals). The beacon includes information such as the identifier (service set ID: SSID) of the access point 3 itself and transmission rates (supported rates) to be supported. The amount of data of a beacon, the beacon transmission rate, the beacon interval, and so on are set in the access point 3.

The wireless communication device 4 is a communication device that is coupled to the access point 3 so as to perform packet communication. The wireless communication device 4 may be a mobile communication device, such as a mobile phone or a notebook personal computer (PC), or may be a stationary wireless communication device. The wireless communication device 4 periodically receives some or all of the control signals sent by the access point 3 and controls connection to the access point 3. Here, communication between the access point 3 and the wireless communication device 4 is half-duplex communication. Consequently, while receiving a control signal from the access point 3, the wireless communication device 4 stops sending packets through the access point 3 to the wired network 2.

The information processing device 10 is a monitoring device that receives a packet of the wired network 2 and analyzes a delay of packet transmission. The information processing device 10 includes a receiver 11 and a determining unit 12.

The receiver 11 receives a packet from the wired network 2. The destination of a packet sent by the wireless communication device 4 may be the information processing device 10, or may be another information processing device coupled to the wired network 2. In the latter case, the receiver 11 captures a packet flowing in the wired network 2 between the access point 3 and an information processing device serving as the destination.

In the case where there is a possibility that a packet that does not pass through the access point 3 is included in packets captured by the receiver 11, it is preferable that the information processing device 10 classify the captured packets with reference to their headers. For example, a set of packets having the same four attributes, the source address, source port number, destination address, and destination port number (packets belonging to the same session) is regarded as one set of packets. Also, for example, a set of packets having the same two attributes, the source address and destination address, or a set of packets having the same source address is regarded as one set of packets. Also, for example, in the case where a subnetwork to which the access point 3 belongs is different from a subnetwork of the source of a packet that does not pass through the access point 3, a set of packets whose source addresses are of the same subnetwork may be regarded as one set of packets.

The determining unit 12 analyzes a delay of packet transmission that occurs in the wireless communication system based on one set of packets received by the receiver 11. The determining unit 12 is a processor, such as a central processing unit (CPU) or a digital signal processor (DSP), for example. The determining unit 12 is an electronic circuit, such as an application specific integrated circuit (ASIC) or a field programmable gate array (FPGA), for example. The processor executes programs stored in a storage device, such as a random access memory (RAM), for example. Besides a computing unit for executing instructions of programs and a register, the processor may include a dedicated electronic circuit.

In a delay analysis, for each packet, the determining unit 12 ascertains a time at which a packet was received (hereinafter referred to as a "reception time") and calculates a difference (hereinafter referred to as a "reception interval") between the reception time of the packet and the reception time of the immediately preceding packet in one set of packets. Then, the determining unit 12 searches one set of packets for a delay packet that was received after at least a predetermined period of time had elapsed since the immediately preceding packet was received (the reception interval is equal to or more than a threshold). The threshold for the reception interval is a period of time used for one reception of a control signal that is calculated based on the amount of data and transmission rate of the control signal set for a typical access point, for example. When the amount of data and transmission rate of a control signal set for the access point 3 has been found, the determining unit 12 may calculate a period of time used for reception of the control signal from the information and regard that period of time as a threshold.

If two or more delay packets are found, the determining unit 12 determines a delay that has occurred because sending of packets has been stopped while the wireless communication device 4 receives a control signal from the access point 3, based on the periodicity of the timing at which a delay packet was received. For example, the determining unit 12 classifies delay packets as a delay packet (a first delay packet) determined to have been delayed because of a control signal and a delay packet (a second delay packet) other than the determined packet, based on the periodicity.

When classifying delay packets, the determining unit 12 selects one delay packet, for example. Then, the determining unit 12 classifies, as the first delay packet, a delay packet that is received at such a timing that the difference between the timing and a timing of a predetermined period calculated relative to the selected delay packet is equal to or less than a threshold. The period of the timing at which the delay packet is received is the transmission period of a control signal set for a typical access point, for example. If the transmission period of a control signal set for the access point 3 is found, the determining unit 12 may classify delay packets by using the transmission period of the access point 3.

For example, in the example of FIG. 1, delay packets 5*a*, 5*b*, 5*c*, and 5*d* are found from among packets received by the information processing device 10. Then, the timings at which the delay packets 5*a*, 5*c*, and 5*d* are received are in accordance with the transmission period of a control signal. In this case, the delay packets 5*a*, 5*c*, and 5*d* are determined as packets that have been delayed because of the control signal. Then, the delay packet 5*b* is determined as a packet that has been delayed by a cause other than the control signal. In this way, when analyzing the causes of packet delays, a user (for example, an administrator of a wireless communication system) of the information processing device 10 may analyze the delays in such a manner that, among all the delays, some delays affected by control signals in a radio zone are separated from the other delays.

A plurality of wireless communication devices may be coupled to the access point 3. In this case, if the correspondence between the access point and the wireless communication devices is found, the information processing device 10 may regard a set of packets sent by the plurality of wireless communication devices as one set of packets and conduct an analysis of delays. If a plurality of access points are coupled to the wired network 2, the information processing device 10 may conduct a delay analysis for each access point.

With the wireless communication system of the first embodiment, monitoring of packets flowing in the wired network 2 allows delays caused by control signals of a radio zone between the access point 3 and the wireless communication device 4 to be determined based on the periodicity of the delay packets. Thus, it is unnecessary to capture radio signals, and therefore it becomes possible to efficiently conduct a delay analysis. In a second embodiment described below, an example of a delay analysis in a wireless LAN will be given.

Second Embodiment

Figure 2:
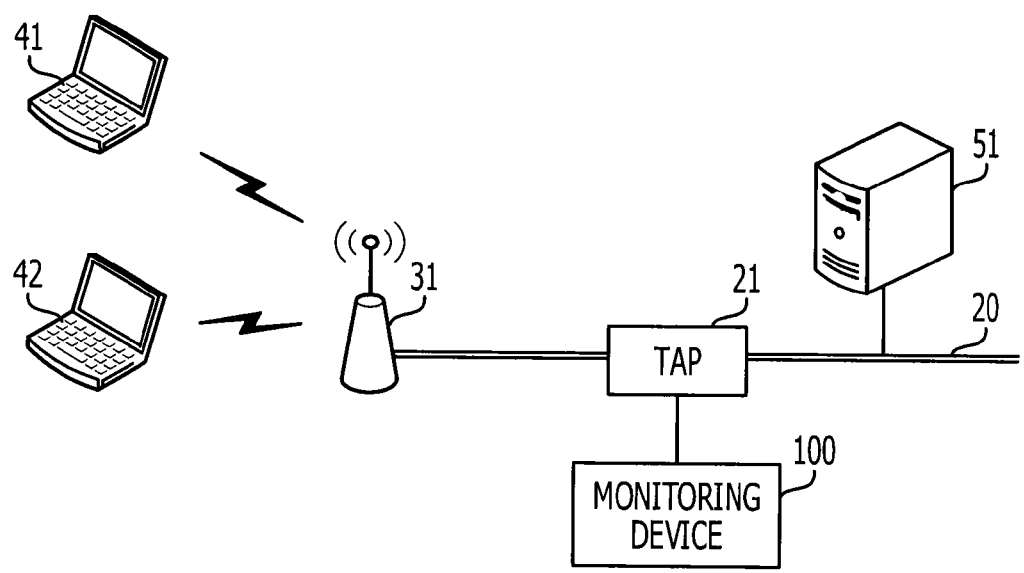
FIG. 2 illustrates an example of a wireless communication system of a second embodiment.

FIG. 2 illustrates an example of a wireless communication system of the second embodiment. The wireless communication system of the second embodiment includes a network 20, a tap 21, an access point 31, terminal devices 41 and 42, a server device 51, and a monitoring device 100.

The network 20 is a wired network that transmits packets using Transmission Control Protocol/Internet Protocol (TCP/IP). The network 20 may also include relay devices, such as a router and a Layer 2 switch. The tap 21 is a signal processing unit coupled to the network 20 and the monitoring device 100. The tap 21 is provided on the communication path from the access point 31 to the server device 51. The tap 21 replicates a signal flowing in the network 20 (in particular, a signal transmitted from the access point 31 to the server device 51), and outputs the replica to the monitoring device 100.

The access point 31 is a wireless communication device coupled to the network 20. The access point 31 wirelessly communicates with the terminal devices 41 and 42 and relays packets between the terminal devices 41 and 42 and the network 20. In the second embodiment, a wireless LAN scheme based on standards of an IEEE 802.11 system is used as a wireless communication scheme. Here, the access point 31 periodically broadcasts control packets called beacons in a wireless manner. The identifier of the access point 31, information on the transmission rate supported by the access point 31, and so on are contained in a beacon.

The terminal devices 41 and 42 are radio terminal devices as client computers operated by users. The terminal devices 41 and 42 may be mobile communication devices, such as mobile phones, personal digital assistant units, or notebook personal computers (PCs), or may be stationary wireless communication devices. The terminal devices 41 and 42 are allowed to establish connection to the access point 31 by detecting beacons broadcast by the access point 31. The terminal devices 41 and 42 maintain the connection to the access point 31 by periodically receiving beacons. The terminal devices 41 and 42 establish TCP sessions through the access point 31 to the server device 51 so as to perform packet communication with the server device 51.

Here, the wireless communication between the access point 31 and the terminal devices 41 and 42 is half-duplex communication. That is, communication (uplink communication) from the terminal devices 41 and 42 to the access point 31 and communication (downlink communication) from the access point 31 to the terminal devices 41 and 42 are not performed simultaneously. Therefore, if the timing at which a beacon is to be received arrives while the terminal devices 41 and 42 are sending packets to the server device 51, the terminal devices 41 and 42 stops sending packets.

The server device 51 is a server computer coupled to the network 20. In response to accesses from the terminal devices 41 and 42, the server device 51 establishes TCP sessions to the terminal devices 41 and 42 and performs packet communication. The server device 51 is a file server that receives a file using a file transfer protocol (FTP), for example.

The monitoring device 100 is a computer that monitors packets flowing in the network 20 and analyzes delays of packet transmission. The monitoring device 100 captures a packet from the access point 31 to the server device 51 based on a signal received through the tap 21 from the network 20. Then, based on a difference (reception interval) between the reception time of one packet and the reception time of the immediately preceding packet, the monitoring device 100 analyzes delays (beacon delays) in sending of packets that have occurred because the terminal devices 41 and 42 have received beacons. In particular, the monitoring device 100 estimates a packet that has been delayed because of a beacon among the captured packets based on the periodicity of a timing at which a delay packet having a large reception interval appears.

The monitoring device 100 may classify the captured packets according to predetermined criteria and conduct the above delay analysis for each set of the classified packets. For example, a set of the packets belonging to the same TCP session (packets having the same source IP address, source port number, destination IP address, and destination port number) is regarded as one set of packets. Also, for example, a set of packets having the same source IP address and destination IP address or a set of packets having the same source IP address is regarded as one set of packets. Also, if the IP address of each of a plurality of terminal devices that make use of the access point 31 (or the address of a subnetwork commonly used by the plurality of terminal devices) is found, a set of packets sent by the plurality of terminal devices may be regarded as one set of packets.

The monitoring device 100 is an example of the information processing device 10 of the first embodiment. The network 20 is an example of the wired network 2 of the first embodiment. The access point 31 is an example of the access point 3 of the first embodiment. The beacon sent by the access point 31 is an example of the control signal sent by the access point 3. The terminal devices 41 and 42 are examples of the wireless communication device 4 of the first embodiment.

Figure 3:
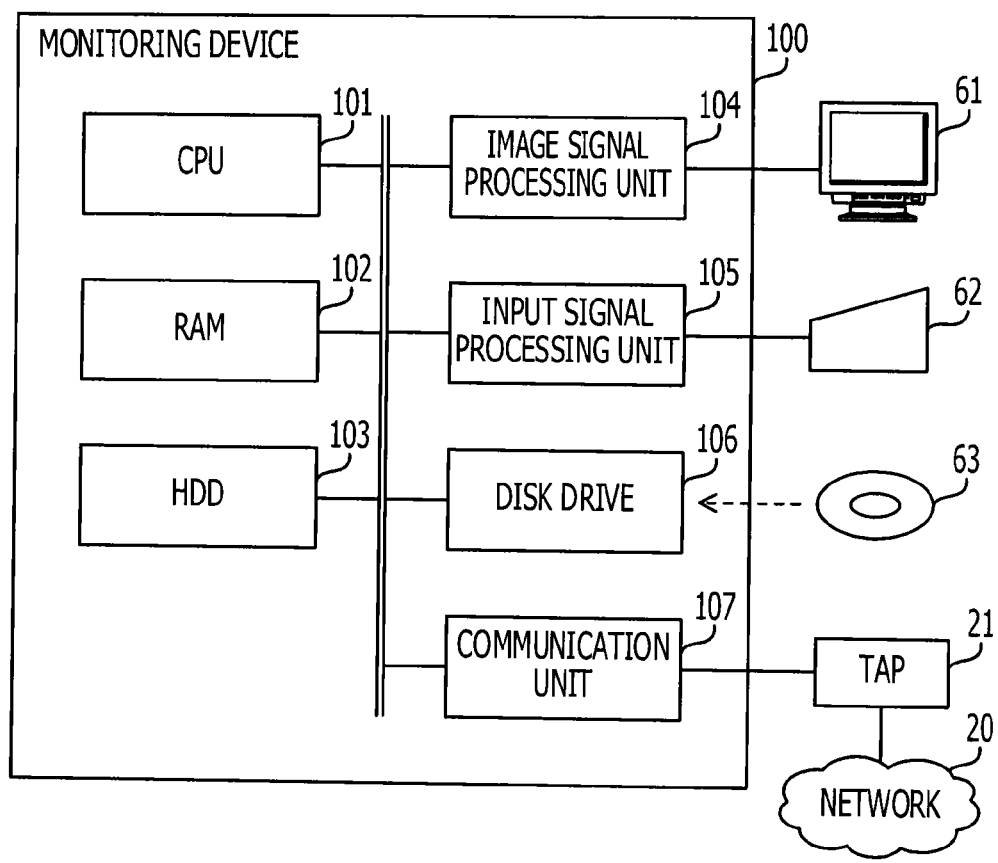
FIG. 3 is a block diagram illustrating an example of hardware of a monitoring device.

FIG. 3 is a block diagram illustrating an example of hardware of a monitoring device. The monitoring device 100 includes a CPU 101, a RAM 102, a hard disk drive (HDD) 103, an image signal processing unit 104, an input signal processing unit 105, a disk drive 106, and a communication unit 107. Each of the above units are coupled to a bus. The CPU 101 is an example of the determining unit 12 of the first embodiment. The communication unit 107 is an example of the receiver 11 of the first embodiment.

The CPU 101 is a processor including a computing unit that executes instructions of programs. The CPU 101 loads at least some of the programs and data stored in the HDD 103 into the RAM 102, and executes a program. The CPU 101 may include a plurality of processor cores, the monitoring device 100 may include a plurality of processors, and processes described below may be performed in parallel using a plurality of processors or processor cores.

The RAM 102 is a volatile memory that temporarily stores programs to be executed by the CPU 101 and data to be referred to during a delay analysis. The monitoring device 100 may include a memory of a type other than RAM, or may include a plurality of volatile memories.

The HDD 103 is a nonvolatile storage device that stores programs of software such as an operating system (OS), firmware, and application software, and data. The monitoring device 100 may include other types of storage devices such as a flash memory and a solid state drive (SSD), and may include a plurality of nonvolatile storage devices.

The image signal processing unit 104 outputs an image to a display 61 coupled to the monitoring device 100 in accordance with an instruction from the CPU 101. The display 61 is a cathode ray tube (CRT) display, a liquid crystal display, or the like, for example.

The input signal processing unit 105 acquires an input signal from an input device 62 coupled to the monitoring device 100, and notifies the CPU 101. The input devices 62 is a pointing device, such as a mouse or a touch panel, a keyboard, or the like, for example.

The disk drive 106 is a drive device that reads programs or data recorded on a recording medium 63. Examples of the recording medium 63 include magnetic disks, such as flexible disks (FDs) and HDDs, optical discs, such as compact discs (CDs) and digital versatile discs (DVDs), and magneto-optical disks (MOs). In accordance with an instruction from the CPU 101, the disk drive 106 stores a program or data read from the recording medium 63 in the RAM 102 or HDD 103.

The communication unit 107 is a wired interface that receives a signal through the tap 21 from the network 20, and extracts a packet from the received signal. The communication unit 107 stores the extracted packet (packet received by the monitoring device 100) in the RAM 102.

The monitoring device 100 does not have to include the disk drive 106. Also, the monitoring device 100 does not have to include the image signal processing unit 104 and the input signal processing unit 105 if the monitoring device 100 is accessible from another computer operated by a user. The display 61 and the input device 62 may be formed integrally with the monitoring device 100.

Figure 4A:
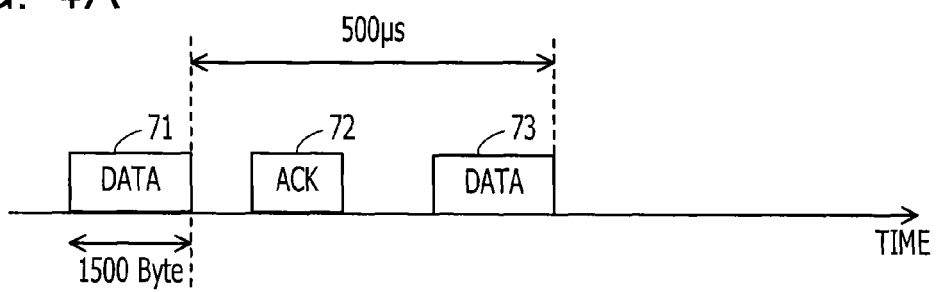
FIG. 4A and FIG. 4B illustrate examples of timings at which packets are sent.
Figure 4B:
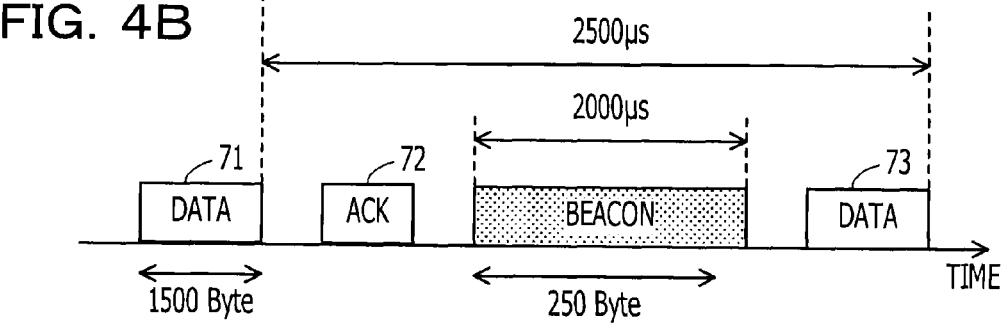

FIG. 4A and FIG. 4B illustrate examples of timings at which packets are sent. As described above, the access point 31 periodically broadcasts beacons at predetermined beacon intervals in a wireless manner. A packet serving as a beacon contains a media access control (MAC) header of 24 bytes, a frame check sequence (FCS) of 4 bytes, and control information of at least 12 bytes. Additional control information is contained in the beacon, and thereby the beacon size becomes 100 bytes or more in many cases. The beacon interval is 102.4 milliseconds in many cases. In order to allow many terminal devices to stably receive beacons and control connections, the transmission rate of the beacon is set at a low speed of about 1 Mbps in many cases. The beacon size, beacon interval, and transmission rate are set for each access point.

The terminal devices 41 and 42 perform a process of beacon reception in accordance with timings at which the access point 31 sends beacons, thereby periodically receiving beacons from the access point 31 and maintaining the connection with the access point 31. In the case where the beacon size is 100 bytes and the beacon transmission rate is 1 Mbps, the period of time (beacon reception period of time) used for the terminal device 41 or 42 to receive a beacon is 100 bytes×8÷1 Mbps=800 µs. In the case where the beacon size is 250 bytes and the beacon transmission rate is 1 Mbps, the beacon reception period of time is 2000 µs. As described above, the terminal devices 41 and 42 each stop sending a packet while receiving a beacon.

As illustrated in FIG. 4A, it is assumed that the terminal device 41 sends a data packet 71 to the server device 51 and receives an acknowledgement (ACK) packet 72, which is a response from the server device 51, and then sends a data packet 73 to the server device 51. It is assumed that the amount of data of each of the data packets 71 and 73 is 1500 bytes. In this case, the transmission interval from the completion of sending of the data packet 71 to the completion of sending of the data packet 73 is 500 µs, for example.

In contrast to this, as illustrated in FIG. 4B, it is assumed that, after receiving the ACK packet 72, the terminal device 41 receives a beacon broadcast by the access point 31 and then sends the data packet 73. That is, it is assumed that the timing at which a beacon is to be received arrives between the sending of the data packet 71 and the sending of the data packet 73. It is assumed that the beacon size is 250 bytes and the beacon transmission rate is 1 Mbps. In this case, the transmission interval from the completion of sending of the data packet 71 to the completion of sending of the data packet 73 increases by 2000 µs relative to the case where a beacon is not received, and, as a result, the transmission interval is 2500 µs, for example.

In this way, the terminal devices 41 and 42 receive beacons from the access point 31, and thereby the sending of packets from the terminal devices 41 and 42 to the server device 51 may be delayed. The above data packet 73 may be said as a packet that has been delayed because of a beacon (beacon delay packet). However, in the wireless communication system of the second embodiment, other reasons sometimes result in packet delays. The monitoring device 100 estimates which packet is a beacon delay packet by analyzing the intervals of packets in the network 20.

Figure 5:
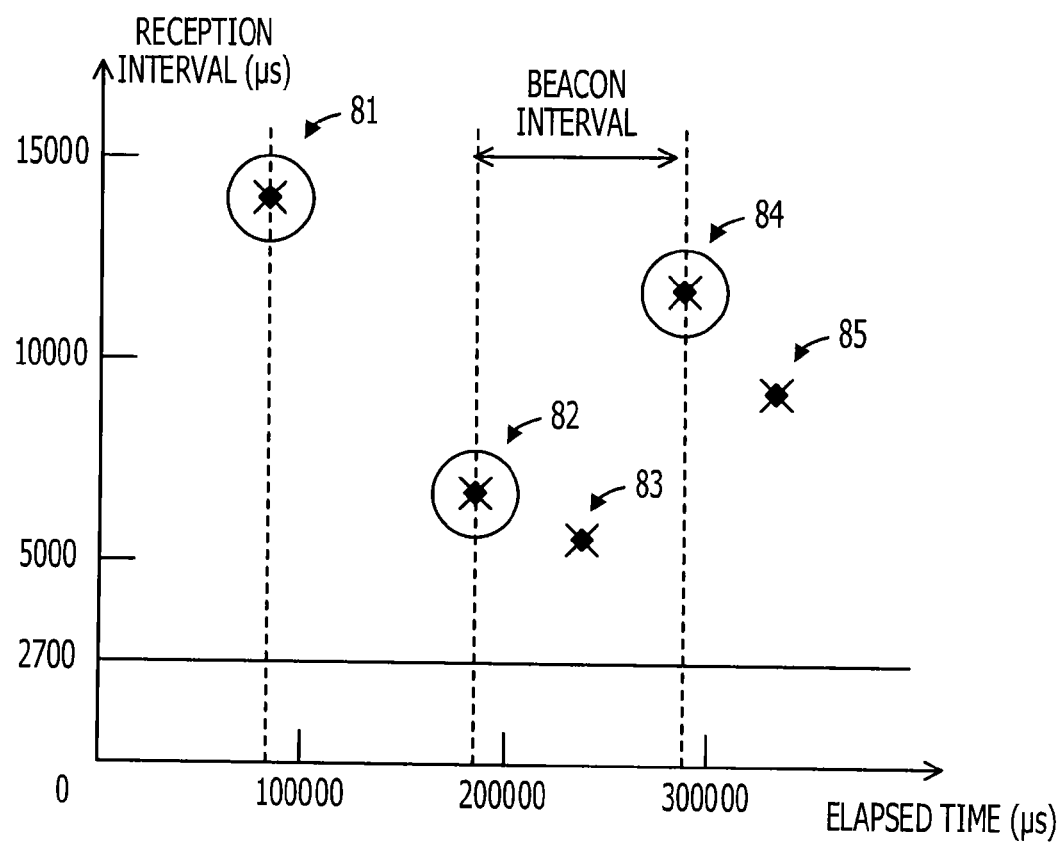
FIG. 5 is a graph illustrating an example of the relationship between the packet reception interval and the beacon delay packet.

FIG. 5 is a graph illustrating an example of the relationship between the packet reception interval and the beacon delay packet. In FIG. 5, the horizontal axis represents the period of time that has elapsed since the monitoring device 100 started the capturing (in units of µs), and the vertical axis represents the reception interval of the captured packets (in units of µs).

The monitoring device 100 arranges a set of packets that satisfy predetermined conditions (for example, a set of packets belonging to the same TCP session) in the order in which the packets are received by the monitoring device 100, and calculates the reception intervals. Then, the monitoring device 100 selects packets whose reception intervals are equal to or more than a threshold (for example, 2700 μs) as packets having the possibility that they are beacon delay packets (delay packets or candidate packets). In the example of FIG. 5, packets 81 to 85 are candidate packets. The reception intervals of many of the packets received by the monitoring device 100 are less than a threshold. In FIG. 5, packets whose reception intervals are less than a threshold are not illustrated.

When determining the periodicity of timings at which candidate packets are received, the monitoring device 100 selects one reference packet from the candidate packets. The reference packet is a candidate packet whose reception time has a difference corresponding to a beacon interval (equal to an integral multiple of the beacon interval, or sufficiently close to an integral multiple of the beacon interval) from the reception time of the immediately preceding candidate packet. In the example of FIG. 5, the difference between the reception time of the packet 81 and the reception time of the packet 82 corresponds to a beacon interval, and therefore the packet 82 is selected as the reference packet.

Then, the monitoring device 100 determines that the reference packet is one of the beacon delay packets, and determines other beacon delay packets out of candidate packets based on the periodicity of the beacon. Specifically, the monitoring device 100 determines that a candidate packet whose reception time has a difference corresponding to the beacon interval from the reception time of the reference packet is a beacon delay packet. In the example of FIG. 5, it is determined that the packets 81 and 84 are beacon delay packets, whereas it is determined that the packets 83 and 85 are not beacon delay packets.

Figure 6:
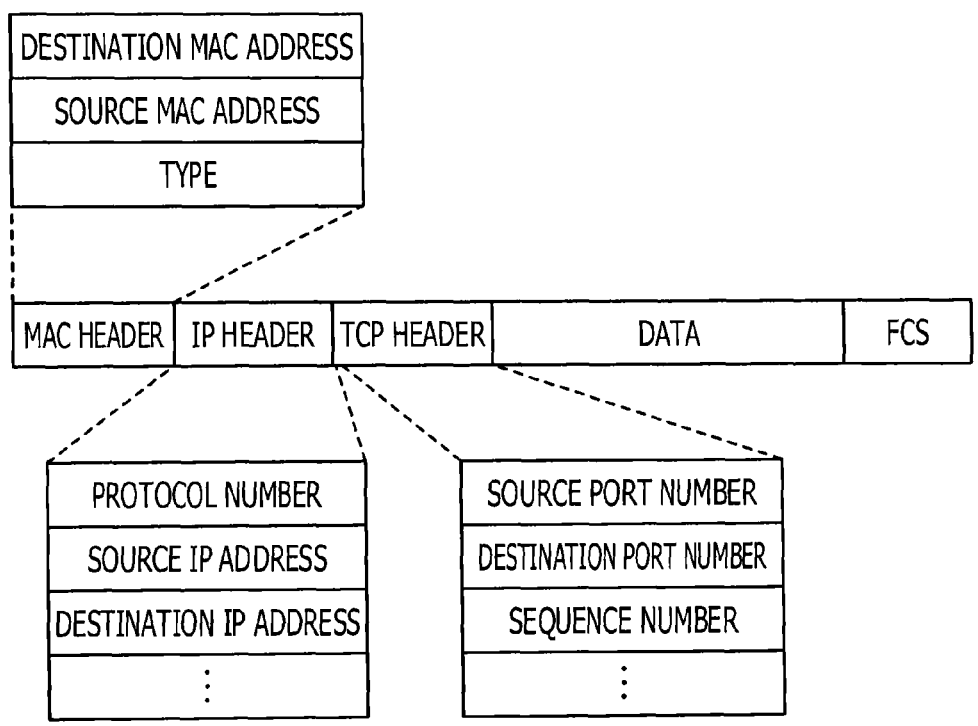
FIG. 6 illustrates an example of a format of a packet.

FIG. 6 illustrates an example of a format of a packet. A MAC frame including a TCP/IP packet as illustrated in FIG. 6 is sent from the access point 31 to the server device 51 in the network 20 and is captured by the monitoring device 100. The "frame" of a MAC layer is sometimes called a packet. This MAC frame contains a MAC header, an IP header, a TCP header, data, and an FCS.

The MAC header is a header portion of a MAC layer protocol. The MAC header contains a destination MAC address of 6 bytes, a source MAC address of 6 bytes, and a type of 2 bytes. The type indicates the type of a protocol (higher-order protocol) used in a layer that is one layer upper than the MAC layer. In the case where the higher-order protocol is IP, a type=0x0800 is set.

The IP header is a header portion of IP. The IP header contains a protocol number of 1 byte, a source IP address of 4 bytes, and a destination IP address of 4 bytes. The protocol number indicates the type of protocol (higher-order protocol) used in a layer that is one layer upper than the IP layer. In the case where the higher-order protocol is TCP, a protocol number=0x06 is set. If this IP header is the header of an IP packet sent from the terminal device 41 to the server device 51, the IP address of the terminal device 41 is set as the source IP address, and the IP address of the server device 51 is set as the destination IP address.

The TCP header is a header portion of TCP and contains a source port number of 2 bytes, a destination port number of 2 bytes, and a sequence number of 4 bytes. If this TCP header is the header of a TCP packet sent from the terminal device 41 to the server device 51, the number of a port used for packet communication by the terminal device 41 is set as the source port number, and the number of a port used for packet communication by the server device 51 is set as the destination port number.

The monitoring device 100 is able to determine whether the captured packet is a TCP/IP packet by ascertaining the type of the MAC header and the protocol number of the IP header. The monitoring device 100 is able to determine the TCP session to which the captured packet belongs by ascertaining the source IP address and destination IP address of the IP header and the source port number and destination port number of the TCP header. The monitoring device 100 is able to identify individual packets using the sequence numbers of TCP headers. Although the monitoring device 100 conducts a delay analysis using a TCP/IP packet in the second embodiment, a delay analysis may be conducted using other types of packets.

Figure 7:
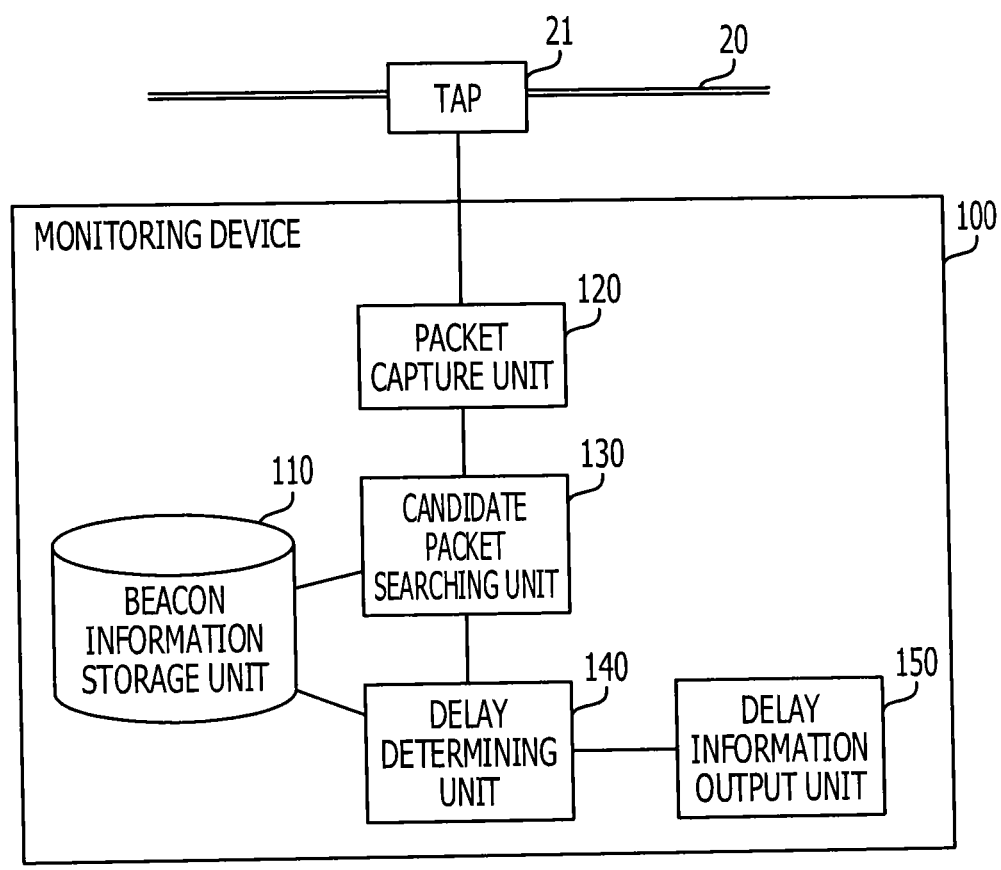
FIG. 7 is a block diagram illustrating an example of a function of the monitoring device.

FIG. 7 is a block diagram illustrating an example of the function of a monitoring device. The monitoring device 100 includes a beacon information storage unit 110, a packet capture unit 120, a candidate packet searching unit 130, a delay determining unit 140, and a delay information output unit 150. The beacon information storage unit 110 is implemented as storage areas secured in the RAM 102 and the HDD 103, for example. The packet capture unit 120, the candidate packet searching unit 130, the delay determining unit 140, and the delay information output unit 150 are implemented as modules of programs to be executed by the CPU 101, for example.

The beacon information storage unit 110 stores beacon information indicating the beacon size, beacon interval, and beacon transmission rate. In cases where the beacon size, beacon interval, and transmission rate set in the access point 31 are found in advance and where they are able to be estimated from the existing processing of the monitoring device 100, beacon information corresponding to the access point 31 is stored in the beacon information storage unit 110. In the other cases, beacon information indicating a typical beacon size, beacon interval, and transmission rate is stored in the beacon information storage unit 110. Instead of the beacon size and transmission rate, information on the beacon reception period of time, which is obtained by dividing the beacon size by the transmission rate, may be contained in the beacon information.

The packet capture unit 120 captures TCP/IP packets sent from the terminal devices 41 and 42 to the server device 51. For example, the packet capture unit 120 selects TCP/IP packets from among packets stored in the RAM 102, and classifies the selected packets based on the source IP address and the like. Then, the packet capture unit 120 generates packet information for each classification category. In the packet information, the sequence number, source IP address, source port number, destination IP address, destination port number, and reception time (a time at which the monitoring device 100 captured the packet) of each packet are contained.

The candidate packet searching unit 130 searches the captured packets for candidate packets based on the packet information generated by the packet capture unit 120. That is, the candidate packet searching unit 130 calculates the reception interval for each packet from the reception time of the packet concerned and the reception time of a packet that belongs to the same category as the packet concerned and has been received immediately before the packet concerned. Then, the candidate packet searching unit 130 selects a delay packet whose reception interval is equal to or more than a threshold, as a candidate packet. The beacon reception period of time calculated based on the beacon size and transmission rate indicated by the beacon information stored in the beacon information storage unit 110, for example, is used as the threshold for the reception interval. The candidate packet searching unit 130 generates candidate packet information. In the candidate packet information, the sequence number, source IP address, source port number, destination IP address, destination port number, reception time, and reception interval of each candidate packet are contained.

The delay determining unit 140 estimates which candidate packet is a beacon delay packet based on the candidate packet information generated by the candidate packet searching unit 130. As described above, first, from the difference in the reception time among candidate packets belonging to the same classification category, the delay determining unit 140 selects a candidate packet having a high possibility of being a beacon delay packet, as a reference packet. Then, based on the reception time of the reference packet, the delay determining unit 140 determines a beacon delay packet that is expected to periodically appear, from the beacon interval indicated by the beacon information stored in the beacon information storage unit 110. The delay determining unit 140 adds a flag indicating whether each candidate packet is a beacon delay packet to the candidate packet information.

Based on the candidate packet information including the flag indicating whether each candidate packet is a beacon delay packet, the delay information output unit 150 generates delay information indicating the result of the delay analysis. Then, the delay information output unit 150 performs at least either displaying the delay information on the display 61 or saving the delay information in the HDD 103. The delay information may also contain a graph that enables beacon delay packets to distinguish from the other candidate packets (for example, a graph as illustrated in FIG. 5). The delay information may also contain information indicating the total delay time generated because of beacons and the total delay time generated because of the other reasons. The total delay time generated because of beacons is calculated in such a way that the number of beacon delay packets is multiplied by the beacon reception period of time, for example.

Figure 8:
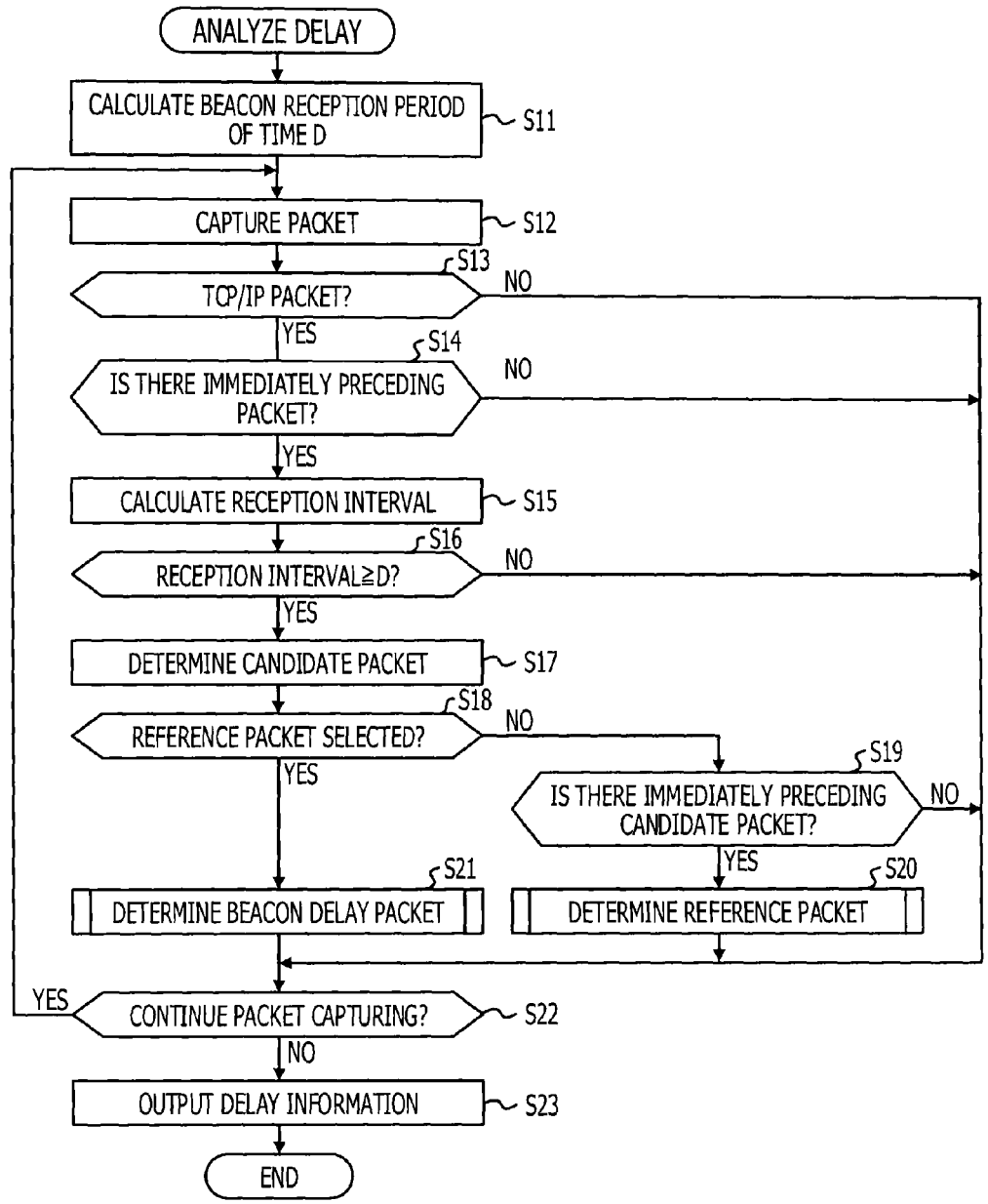
FIG. 8 is a flowchart illustrating an example of a procedure of delay analysis.

FIG. 8 is a flowchart illustrating an example of a procedure of delay analysis.

(S11) The candidate packet searching unit 130 ascertains the beacon size and transmission rate indicated by the beacon information stored in the beacon information storage unit 110, and calculates a beacon reception period of time D (a period of time used for one beacon reception) by dividing the beacon size by the transmission rate.

(S12) The packet capture unit 120 captures a packet from the access point 31 destined to the server device 51. Then, the packet capture unit 120 ascertains the current time (the reception time of the captured packet).

(S13) The packet capture unit 120 determines whether the captured packet is a TCP/IP packet. When the type of the MAC header indicates IP and the protocol number of the IP header indicates TCP, the packet is determined as a TCP/IP packet. If the captured packet is a TCP/IP packet, the process proceeds to S14; if the captured packet is a packet other than the TCP/IP packet, then the process proceeds to S22.

(S14) The candidate packet searching unit 130 determines whether there is a packet that belongs to the same classification category as the packet captured in S12 (for example, belonging to the same TCP session) and has been captured immediately before. If so, the process proceeds to S15; if not, the process proceeds to S22. The immediately preceding packet may be a packet having the immediately preceding sequence number, rather than a packet received immediately before.

(S15) The candidate packet searching unit 130 calculates a difference (reception interval) between the reception time of the packet captured in S12 and that of a packet captured immediately before.

(S16) The candidate packet searching unit 130 determines whether the reception interval calculated in S15 is equal to or more than the beacon reception period of time D calculated by S11. If the condition is satisfied, the process proceeds to S16; if not, the process proceeds to S22.

(S17) The candidate packet searching unit 130 determines that the packet captured in S12 is a candidate packet. Information on this packet may be deleted from the candidate packet information described above after a certain period of time has elapsed since the packet was captured.

(S18) The delay determining unit 140 determines whether the reference packet has already been selected. If already selected, the process proceeds to S21; if not, the process proceeds to S19.

(S19) The delay determining unit 140 determines whether there is a candidate packet that belongs to the same classification category as the candidate packet determined in S17 and immediately precedes that candidate packet. If so, the process proceeds to S20; if not, the process proceeds to S22.

(S20) The delay determining unit 140 determines whether the candidate packet determined in S17 is selected as the reference packet. If the candidate packet is selected as the reference packet, the delay determining unit 140 searches other candidate packets received before the reference packet for a beacon delay packet. Details of this processing will be described later.

(S21) The delay determining unit 140 determines whether the candidate packet determined in S17 is a beacon delay packet. Details of this processing will be described later.

(S22) The packet capture unit 120 determines whether to continue packet capturing. Examples of opportunities for stopping packet capturing include that a stop command is accepted from a user, that a period of time for capture specified in advance has elapsed, that the number of captured packets reaches a maximum number specified in advance. If packet capturing is continued, the process proceeds to S12; if not, the process proceeds to S23.

(S23) The delay information output unit 150 generates delay information so as to allow a beacon delay packet to distinguish from candidate packets that are not the beacon delay packet (packets delayed because of reasons other than the beacon). The delay information output unit 150 saves the generated delay information in the HDD 103, for example, and displays a graph as illustrated in FIG. 5 on the display 61.

Figure 9:
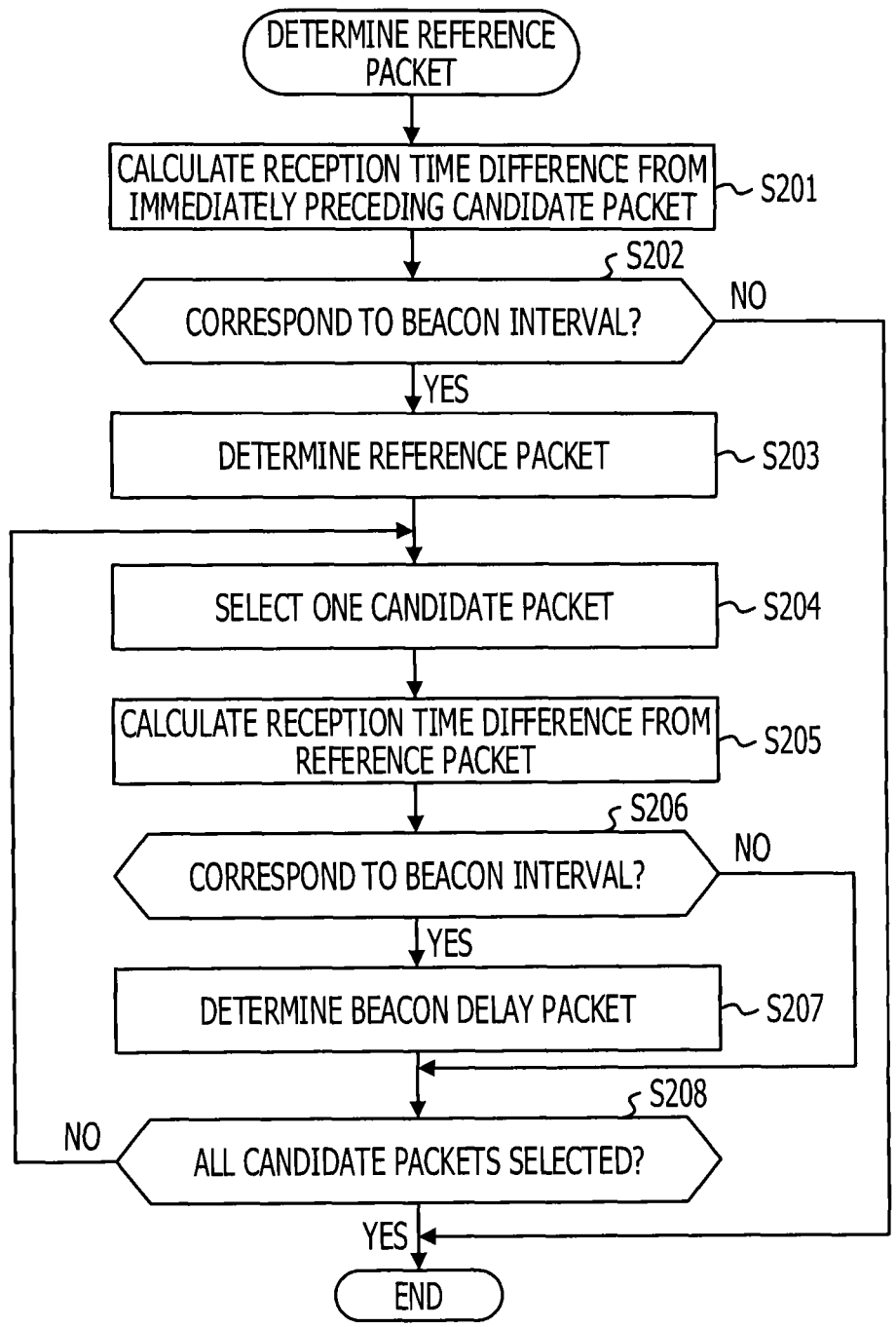
FIG. 9 is a flowchart illustrating an example of a procedure of reference packet determination.

FIG. 9 is a flowchart illustrating an example of a procedure of determining a reference packet. The process illustrated in this flowchart is performed in S20 mentioned above.

(S201) The delay determining unit 140 ascertains the reception time of the candidate packet determined in S17 mentioned above and the reception time of the immediately preceding candidate packet belonging to the same classification category as the determined candidate packet, and calculates the difference between the two reception times.

(S202) The delay determining unit 140 determines whether the difference between the reception times calculated in S201 corresponds to the beacon interval indicated by the beacon information stored in the beacon information storage unit 110. In a determination of whether the difference corresponds to the beacon interval, some timing misalignment is tolerated. For example, the delay determining unit 140 determines that the difference between the reception times corresponds to the beacon interval when the difference between the reception times belongs to the range from the beacon interval$\times n-\alpha$ to the beacon interval×n+α (n is an integer of 1 or more). As the parameter α, the period of time (for example, 500 μs) used for the terminal device 41 or 42 to send one packet of the maximum size may be used. Also, the beacon interval×a predetermined rate (for example, 0.1) may be used as the parameter α. If the difference between the reception times corresponds to the beacon interval, the process proceeds to S203; if not, the process ends.

(S203) The delay determining unit 140 determines to adopt the candidate packet determined in S17 as the reference packet. The delay determining unit 140 determines that the determined reference packet is a beacon delay packet.

(S204) The delay determining unit 140 selects one candidate packet that belongs to the same classification category as the reference packet and has been captured before the reference packet.

(S205) The delay determining unit 140 ascertains the reception time of the reference packet and the reception time of the candidate packet selected in S204, and calculates the difference between the two reception times.

(S206) The delay determining unit 140 determines whether the difference between the reception times calculated in S205 corresponds to the beacon interval indicated by the beacon information. For example, the delay determining unit 140 determines that the difference between the reception times corresponds to the beacon interval when the difference between the reception times belongs to the range from the beacon interval×n−α to the beacon interval×n+α. If the difference between the reception times corresponds to the beacon interval, the process proceeds to S207; if not, the process proceeds to S208. In the latter case, the information on the packet selected in S204 may be deleted from the candidate packet information.

(S207) The delay determining unit 140 determines that the candidate packet selected in S204 is a beacon delay packet (a packet delayed because of the beacon).

(S208) In S204, the delay determining unit 140 determines whether all of the candidate packets preceding the reference packet have been selected. If all of them have been selected, the process ends; if a candidate packet that has not been selected remains, the process proceeds to S204.

In the above description, when it is determined whether some candidate packet is selected as the reference packet, the difference between the reception time of the candidate packet concerned and the reception time of the immediately preceding candidate packet is ascertained. Additionally, the difference between the reception time of the candidate packet concerned and the reception time of a second preceding candidate packet or a third preceding candidate packet may be ascertained.

Figure 10:
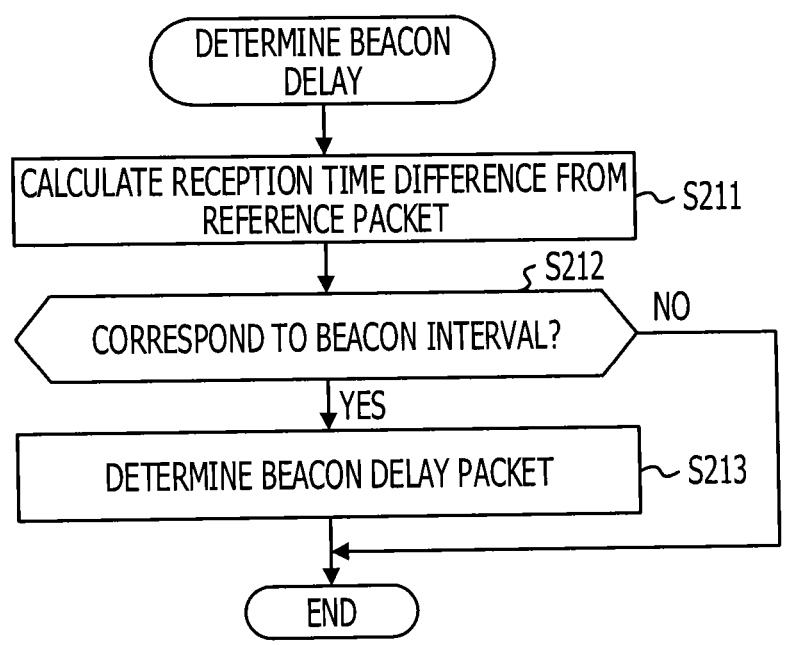
FIG. 10 is a flowchart illustrating an example of a procedure of beacon delay determination.

FIG. 10 is a flowchart illustrating an example of a procedure of beacon delay determination. The process illustrated in this flowchart is performed in S21 mentioned above.

(S211) The delay determining unit 140 ascertains the reception time of the candidate packet determined in S17 mentioned above and the reception time of the reference packet, and calculates the difference between the two reception times.

(S212) The delay determining unit 140 determines whether the difference between the reception times calculated in S211 corresponds to the beacon interval indicated by the beacon information stored in the beacon information storage unit 110. For example, the delay determining unit 140 determines that the difference between the reception times corresponds to the beacon interval when the difference between the reception times belongs to the range from the beacon interval×n−α to the beacon interval×n+α. If the difference between the reception times corresponds to the beacon interval, the process proceeds to S213; if not, the process ends.

(S213) The delay determining unit 140 determines that the candidate packet determined in S17 is a beacon delay packet (a packet delayed because of a beacon).

Modifications of the processing procedure illustrated in FIGS. 8 to 10 referred to in the above will be described next. First, a description will be given of a process of estimating a beacon interval if the monitoring device 100 does not know the beacon interval of the access point 31. Then, a description will be given of a process in which if a plurality of candidate packets are detected near the timing that is apart from the reception time of the reference packet by only an integral multiple of the beacon interval, only any one of the plurality of candidate packets is determined as a beacon delay packet.

Figure 11:
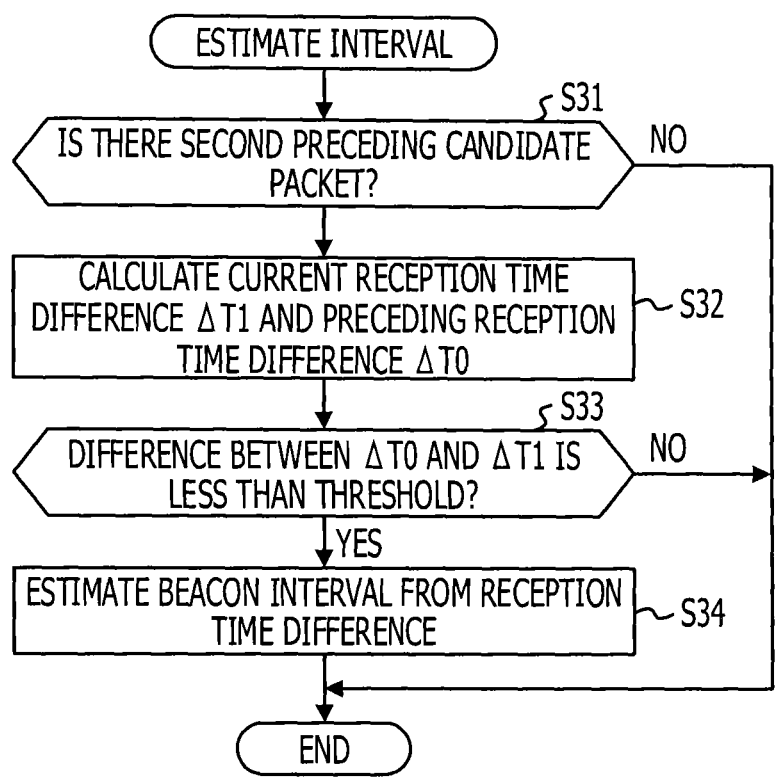
FIG. 11 is a flowchart illustrating an example of a procedure of interval estimation.

FIG. 11 is a flowchart illustrating an example of a procedure of estimating an interval. The process illustrated in this flowchart is performed both between S201 and S202 mentioned above (or between S19 and S20) and between S211 and S212 mentioned above (or between S18 and S21).

(S31) The delay determining unit 140 determines whether there are immediately preceding and second preceding candidate packets that belong to the same classification category as the candidate packet determined in the above S17. If so, the process proceeds to S32; if not, the process ends.

(S32) The delay determining unit 140 calculates a difference ΔT1 between the reception time of the candidate packet determined in S17 and the reception time of the immediately preceding candidate packet, and also calculates a difference ΔT0 between the reception time of the immediately preceding candidate packet and the reception time of the second preceding candidate packet.

(S33) The delay determining unit 140 determines whether the difference between ΔT0 and ΔT1 calculated in S32 is less than a threshold. It is assumed that the threshold is 2α, for example, such that some timing misalignment may be tolerated. If the difference between ΔT0 and ΔT1 is less than the threshold, the process proceeds to S34. If the difference between ΔT0 and ΔT1 is equal to or more than the threshold, the process ends.

(S34) The delay determining unit 140 estimates the beacon interval of the access point 31 from ΔT0 and ΔT1 calculated in S32. For example, the delay determining unit 140 estimates that the average of ΔT0 and ΔT1 is the beacon interval.

Figure 12:
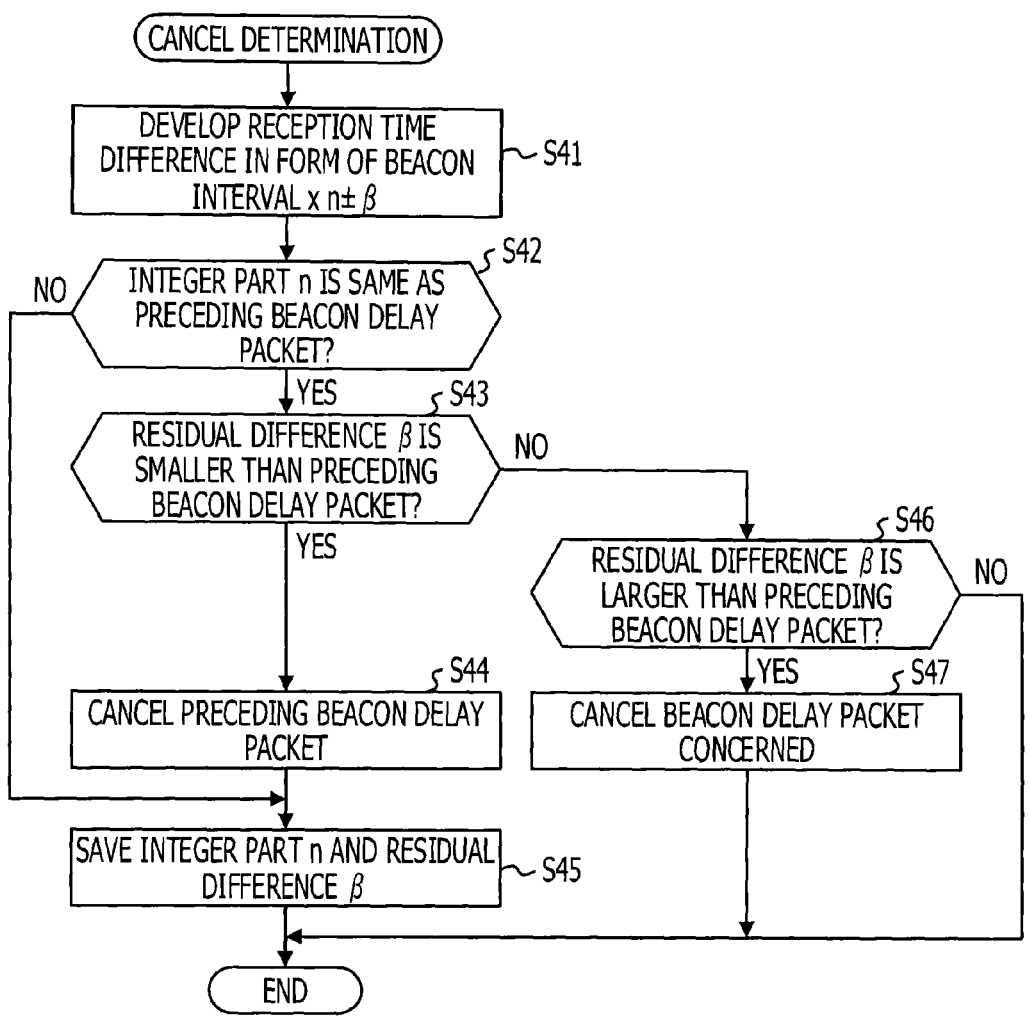
FIG. 12 is a flowchart illustrating an example of a procedure of determination cancellation.

FIG. 12 is a flowchart illustrating an example of a procedure of cancelling a determination. The process illustrated in this flowchart is performed immediately after each of S207 and S213 mentioned above.

(S41) The delay determining unit 140 develops the difference between the reception time of the packet determined as a beacon delay packet in S207 or S213 mentioned above and the reception time of the reference packet in the form of the beacon interval×n±β. The residual difference β is a difference between the reception time of the packet concerned and the closest beacon timing (a timing apart from the reception time of the reference packet by an integral multiple of the beacon interval). The integer part n is calculated in such a way, for example, that the difference between the reception time of the beacon delay packet and the reception time of the reference packet is divided by the beacon interval, and then the obtained quotient is rounded off.

(S42) The delay determining unit 140 determines whether the integer part n calculated in S41 is the same as a packet determined as the immediately preceding beacon delay packet. If the integer part n is the same, the process proceeds to S43; if the integer part n is different, the process proceeds to S45.

(S43) The delay determining unit 140 determines whether the residual difference β calculated in S41 is smaller than the packet determined as the immediately preceding beacon delay packet. If the residual difference β is smaller, the process proceeds to S44; if not, the process proceeds to S46.

(S44) The delay determining unit 140 cancels the determination for the packet determined as the immediately preceding beacon delay packet and determines that the packet is not a beacon delay packet.

(S45) The delay determining unit 140 saves the integer part n and the residual difference β calculated in S41 as information on the immediately preceding beacon delay packet.

(S46) The delay determining unit 140 determines whether the residual difference β calculated in S41 is larger than the packet determined as the immediately preceding beacon delay packet. If the residual difference β is larger, the process proceeds to S47; if not larger (smaller or the same), the process ends.

(S47) The delay determining unit 140 cancels the determination for the packet determined as the beacon delay packet in S207 or S213 mentioned above.

Figure 13A:
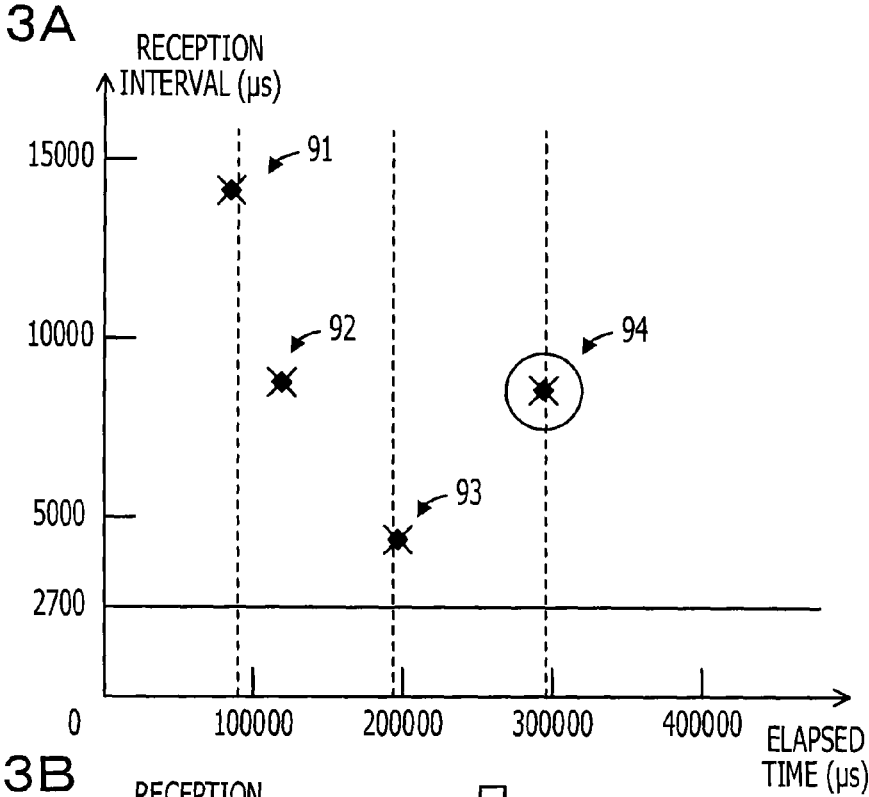
FIG. 13A and FIG. 13B are graphs illustrating examples of situations in which beacon delay packets are determined.
Figure 13B:
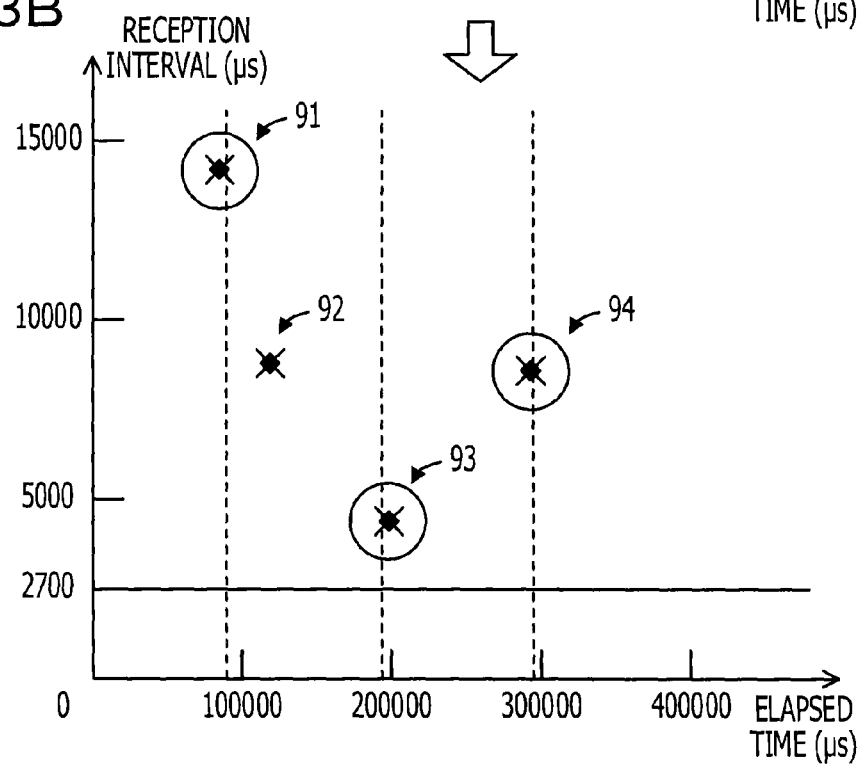

FIG. 13A and FIG. 13B are graphs illustrating examples of situations in which beacon delay packets are determined. In FIG. 13A and FIG. 13B, the horizontal axis represents the period of time that has elapsed since the monitoring device 100 started capturing, and the vertical axis represents the reception interval of the captured packet. In FIG. 13A and FIG. 13B, the threshold of the reception interval is 2700 μs, and packets whose reception intervals are each less than the threshold are not illustrated.

As illustrated in FIG. 13A, when sequentially capturing packets 91 to 94, the monitoring device 100 determines the packets 91 to 94 whose reception intervals are each equal to or more than the threshold, as candidate packets. Here, there is no candidate packet that precedes the packet 91, and therefore the packet 91 is not selected as the reference packet. The difference between the reception time of the packet 92 and the reception time of the immediately preceding packet 91 does not correspond to the beacon interval, and therefore the packet 92 is not selected as the reference packet. Similarly, the packet 93 is also not selected as the reference packet. In contrast, the packet 94 is selected as the reference packet because the difference between the reception time of the packet 94 and the reception time of the immediately preceding packet 93 corresponds to the beacon interval (the difference between the reception times is approximately equal to the beacon interval). At this point, the packet 94 is the reference packet, and is also determined as a beacon delay packet.

As illustrated in FIG. 13B, upon selection of the packet 94 as the reference packet, the monitoring device 100 determines whether each of the packets 91 to 93, which are candidate packets captured before the reference packet, is a beacon delay packet. The packet 91 is determined as a beacon delay packet because the difference between the reception time of the packet 91 and the reception time of the reference packet corresponds to the beacon interval (the difference between the reception times is approximately twice the beacon interval). The packet 92 is not determined as a beacon delay packet because the difference between the reception times does not correspond to the beacon interval. The packet 93 is determined as a beacon delay packet because the difference between the reception times corresponds to the beacon interval (the difference between the reception times is approximately equal to the beacon interval).

In this way, it is determined that, among the packets 91 to 94 that are delay packets whose reception intervals are large, the packets 91, 93, and 94 are packets delayed because of beacons. In contrast, it is determined that the packet 92 is a packet delayed because of a reason other than a beacon.

Figure 14A:
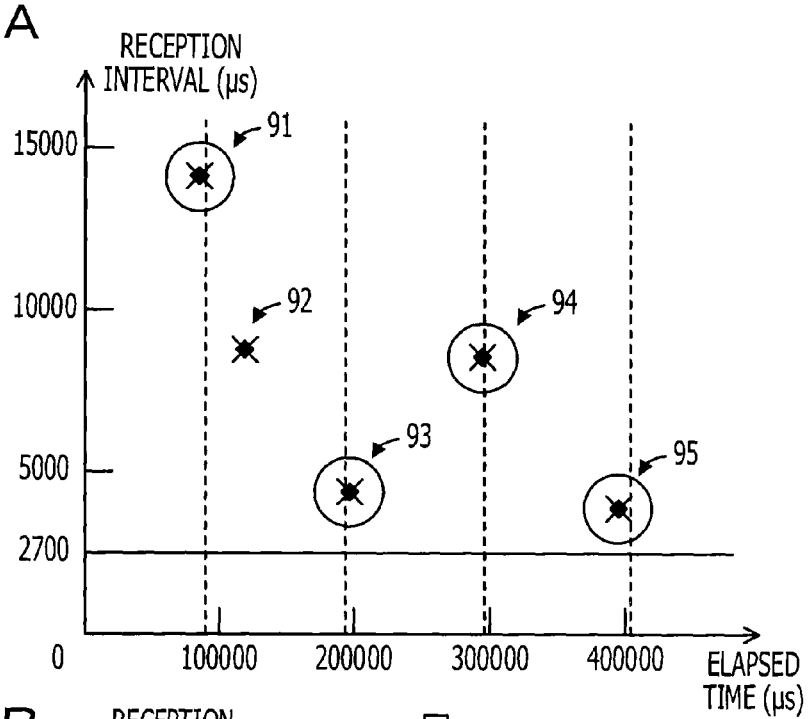
FIG. 14A and FIG. 14B are graphs (continuation) illustrating examples of situations in which beacon delay packets are determined.
Figure 14B:
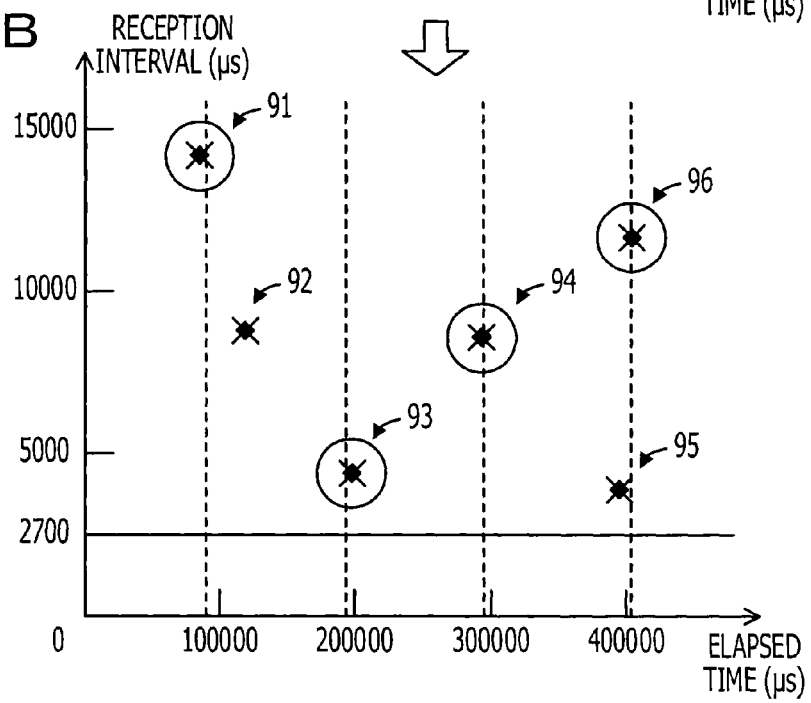

FIG. 14A and FIG. 14B are graphs (continuation) illustrating examples of situations in which beacon delay packets are determined. In FIG. 14A and FIG. 14B, as in FIG. 13A and FIG. 13B, the horizontal axis represents the period of time that has elapsed since the monitoring device 100 started capturing, and the vertical axis represents the reception interval of the captured packet. In FIG. 14A and FIG. 14B, the threshold of the reception interval is 2700 μs, and packets whose reception intervals are each less than the threshold are not illustrated.

As illustrated in FIG. 14A, as in FIG. 13A, the monitoring device 100 determines that a packet 95 that has been captured after the packets 94, which is the reference packet, and whose reception interval is equal to or larger than the threshold is a candidate packet. At this point, the packet 95 is determined as a beacon delay packet because the difference between the reception time of the packet 95 and the reception time of the packet 94, which is the reference packet, corresponds to the beacon interval (the difference between the reception times is approximately equal to the beacon interval).

As illustrated in FIG. 14B, the monitoring device 100 determines that a packet 96 that has been captured after the packets 95 and whose reception interval is equal to or larger than the threshold is a candidate packet. At this point, the packet 96 is determined as a beacon delay packet because the difference in the reception time between the packet 96 and the packet 94, which is the reference packet, corresponds to the beacon interval (the difference between the reception times is approximately equal to the beacon interval). Here, the beacon timing closest to the reception time of the packet 95 and the beacon timing closest to the reception time of the packet 96 are the same, and the residual difference of the packet 96 is smaller than the residual difference of the packet 95. Accordingly, the monitoring device 100 cancels the determination that the packet 95 is a beacon delay packet.

In this way, it is determined that, among the packets 91 to 96 that are delay packets whose reception intervals are large, the packets 91, 93, 94 and 96 are packets delayed because of beacons. It is also determined that the packets 92 and 95 are packets delayed because of reasons other than beacons.

A modification of the configuration of a wireless communication system will be described next. When a plurality of access points are coupled to the network 20, a monitoring device coupled through the tap 21 to the network 20 may conduct a delay analysis for each access point.

Figure 15:
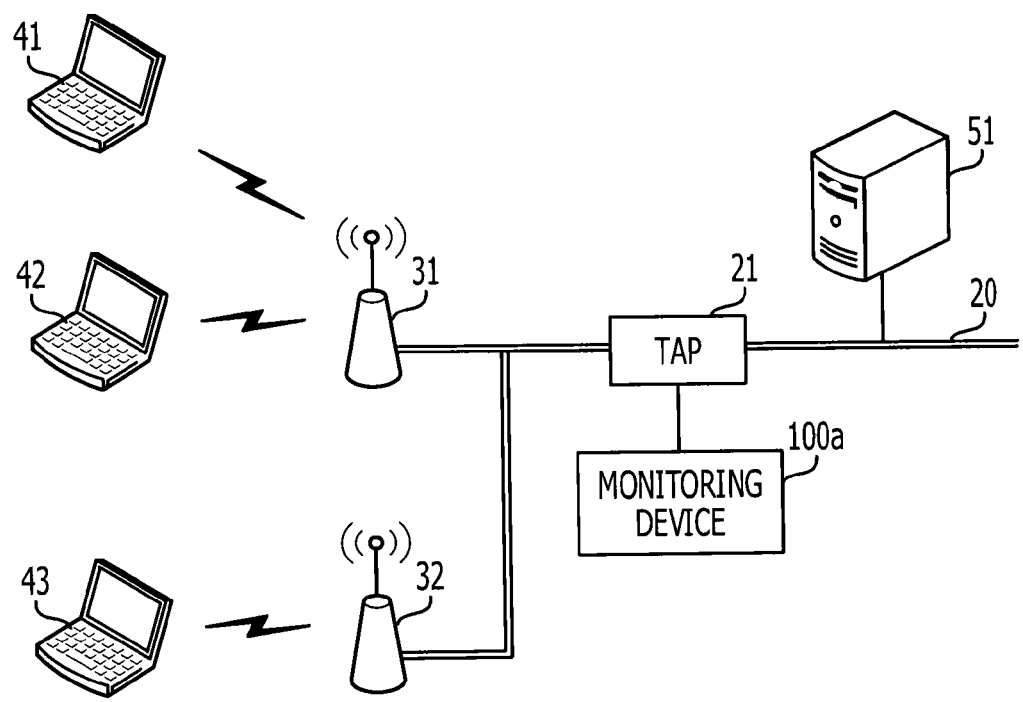
FIG. 15 illustrates an example of a modification of the wireless communication system.

FIG. 15 illustrates an example of a modification of the wireless communication system. Besides the access point 31, an access point 32 is coupled to the network 20. The access point 32 periodically broadcasts beacons in a wireless manner. The terminal device 43 is coupled to the access point 32 and periodically receives beacons from the access point 32. The terminal device 43 sends packets through the access point 32 to the server device 51. The tap 21 is located on the path of packet communication from the access point 31 to the server device 51 and is located on the path of packet communication from the access point 32 to the server device 51.

Instead of the monitoring device 100 of FIG. 2, a monitoring device 100a is coupled to the tap 21. The monitoring device 100a classifies the captured packets so that packets passing through the access point 31 and packets passing through the access point 32 belong to different categories, and conducts a delay analysis for each access point. Beacon information indicating the beacon size, beacon interval, and beacon transmission rate may be prepared for each access point.

In order to classify packets, the monitoring device 100a may hold information on the correspondences between the terminal devices 41 to 43 and the access points 31 and 32. That is, the monitoring device 100a may hold information that the terminal devices 41 and 42 use the access point 31 and the terminal device 43 uses the access point 32. In the information on the correspondences, the terminal devices 41 to 43 are identified by their IP addresses, for example. In that case, the monitoring device 100a divides based on the source IP addresses the captured packets into a set of packets that have passed through the access point 31 and a set of packets that have passed through the access point 32. The monitoring device 100a may distinguish the influence of beacons of the access point 31 from the influence of beacons of the access point 32 by conducting a delay analysis for every set of packets.

With the monitoring device 100 (or the monitoring device 100a) of the second embodiment, the intervals of packets flowing in the network 20 are observed, and packets delayed because of beacons in a radio zone are estimated based on the periodicity of timings at which delayed packets having large intervals appear. Accordingly, even if radio signals are not directly captured, the packet delays that have occurred because of beacons may be analyzed, and thus a delay analysis of the wireless communication system may be conducted efficiently. Also, by conducting a delay analysis not in a radio zone but in a wired zone, it becomes possible to intensively analyze packet communication for a plurality of terminal devices and a plurality of access points, enabling a delay analysis to be efficiently conducted.

As described above, the information processing of the first embodiment may be realized by causing the information processing device 10 to execute programs. The information processing of the second embodiment may be realized by causing the monitoring device 100 or 100a to execute programs. Such programs may be recordable on a computer-readable recording medium (for example, the recording medium 63). As the recording medium, a magnetic disk, optical disc, magneto-optical disc, or semiconductor memory may be used, for example. An FD and an HDD are included in the magnetic disk. A CD, CD-R (recordable)/RW (rewritable), DVD, and DVD-R/RW are included in the optical disc.

In the case of circulating a program, a portable recording medium on which the program concerned is recorded is provided, for example. Also, the program may be stored in a storage device of another computer and be distributed over a network (for example, over the network 20). A computer stores a program recorded on a portable recording medium, or a program received from another computer, in a storage device (for example, the HDD 103) and reads and executes the program from the storage device, for example. However, the program read from the portable recording medium may be directly executed, and the program received over the network from another computer may be directly executed. Also, it is possible to realize at least part of the above information processing by using an electronic circuit, such as a DSP, ASIC, or programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network analysis method using an information processing device, comprising:
    receiving packets from a wired network;
    extracting, from a set of the received packets, a first delay packet, a second delay packet which is received after the first delay packet is received, and a third delay packet which is received after the second packet is received, each of the first, second and third delay packets being received after at least a predetermined period of time had elapsed since an immediately preceding packet was received; and
    determining that a packet delay because of a control signal wirelessly sent from an access point coupled to the wired network has occurred, based on a periodicity provided by a reception interval between the first and second delay packets and a reception interval between the second and third delay packets.

2. The network analysis method according to claim 1, wherein
    the set of the packets is a set of packets obtained by classifying the received packets according to predetermined criteria.

3. The network analysis method according to claim 2, wherein
    the set of the packets is a set of a plurality of packets belonging to the same session, a set of a plurality of packets having the same combination of a source address and a destination address, or a set of a plurality of packets having the same source address.

4. The network analysis method according to claim 1, wherein
    the extracting includes, for each packet, ascertaining a time at which a packet was received and calculating a difference between the time and a time at which an immediately preceding packet in one set of packets was received.

5. The network analysis method according to claim 4, wherein
    the extracting further includes searching one set of packets for a delay packet that was received after at least a predetermined period of time had elapsed since the immediately preceding packet was received.

6. The network analysis method according to claim 5, wherein
    the predetermined period of time is a period of time used for one reception of a control signal, the period of time being calculated based on the amount of data and transmission rate of the control signal set for the access point.

7. The network analysis method according to claim 1, wherein
    the periodicity is a characteristic cycle in which a wireless communication device configured to send a packet through the access point to the wired network receives the control signal from the access point.

8. The network analysis method according to claim 1, wherein
    in the determining of the delay, a plurality of extracted delay packets are classified based on the periodicity as a first delay packet group determined to have been delayed because of the control signal and a second delay packet group other than the first delay packet group.

9. The network analysis method according to claim 8, wherein in the determining of the delay, one delay packet is selected from the plurality of extracted delay packets, and a delay packet that is received at such a timing that a difference between the timing and a timing of a predetermined period calculated relative to the selected delay packet is equal to or less than a threshold is classified as the first delay packet group.

10. The network analysis method according to claim 7, wherein
a period of the timing at which a delay packet is received is a transmission period of the control signal set for the access point.

11. An information processing device, comprising:
a memory; and
a processor coupled to the memory and configured to:
receive packets from a wired network;
extract, from a set of the received packets, a first delay packet, a second delay packet which is received after the first delay packet is received, and a third delay packet which is received after the second packet is received, each of the first, second and third delay packets being received after at least a predetermined period of time had elapsed since an immediately preceding packet was received; and
determine that a packet delay because of a control signal wirelessly sent from an access point coupled to the wired network has occurred, based on a periodicity provided by a reception interval between the first and second delay packets and a reception interval between the second and third delayed packets.

12. A non-transitory computer-readable recording medium storing a program that causes a computer to execute a process, the process comprising:
receiving packets from a wired network;
extracting, from a set of the received packets, a first delay packet, a second delay packet which is received after the first delay packet is received, and a third delay packet which is received after the second packet is received, each of the first, second and third delay packets being received after at least a predetermined period of time had elapsed since an immediately preceding packet was received; and
determining that a packet delay because of a control signal wirelessly sent from an access point coupled to the wired network has occurred, based on a periodicity provided by a reception interval between the first and second delayed packets and a reception interval between the second and third delayed packets.

* * * * *